United States Patent [19]
Helmeke

[11] Patent Number: 6,133,400
[45] Date of Patent: Oct. 17, 2000

[54] HIGH MOISTURE VAPOR TRANSMISSION HOT MELT MOISTURE CURE POLYURETHANE ADHESIVE WITH EXCELLENT HYDROLYSIS RESISTANCE

[75] Inventor: Marietta B. Helmeke, Little Canada, Minn.

[73] Assignee: H. B. Fuller Licensing, Inc., St. Paul, Minn.

[21] Appl. No.: 09/234,181

[22] Filed: Jan. 20, 1999

[51] Int. Cl.[7] ...................................................... C08G 18/30
[52] U.S. Cl. ............................ 528/83; 428/334; 428/335; 428/336; 428/423.1; 528/59; 528/76; 528/80; 528/905
[58] Field of Search ................................... 528/83, 59, 76, 528/80, 905; 428/334, 335, 336, 423.1

[56] References Cited

U.S. PATENT DOCUMENTS

| | | |
|---|---|---|
| 3,645,925 | 2/1972 | Speranza et al. . |
| 4,194,041 | 3/1980 | Gore et al. . |
| 4,532,316 | 7/1985 | Henn . |
| 4,594,286 | 6/1986 | McKinney et al. . |
| 4,758,648 | 7/1988 | Rizk et al. . |
| 4,775,719 | 10/1988 | Markevka et al. . |
| 4,780,520 | 10/1988 | Rizk et al. . |
| 4,808,255 | 2/1989 | Markevka et al. . |
| 4,820,368 | 4/1989 | Markevka et al. . |
| 4,925,732 | 5/1990 | Driskill et al. . |
| 5,130,404 | 7/1992 | Freeland . |
| 5,166,302 | 11/1992 | Werner et al. . |
| 5,173,538 | 12/1992 | Gilch et al. . |
| 5,189,073 | 2/1993 | Humbert el al. . |
| 5,441,808 | 8/1995 | Anderson et al. . |
| 5,508,371 | 4/1996 | Werenicz et al. . |
| 5,550,191 | 8/1996 | Hung et al. . |
| 5,560,974 | 10/1996 | Langley . |

FOREIGN PATENT DOCUMENTS

| | | |
|---|---|---|
| 0 455 400 A2 | 4/1941 | European Pat. Off. . |
| 0 668 302 A1 | 8/1945 | European Pat. Off. . |
| 0 492 824 A2 | 12/1980 | European Pat. Off. . |
| 4 121 703 | 2/1993 | Germany . |
| 5 117 619 | 10/1991 | Japan . |

*Primary Examiner*—John M. Cooney, Jr.
*Attorney, Agent, or Firm*—Nancy N. Quan

[57] ABSTRACT

This invention relates to a hot melt moisture cure polyurethane composition which is the reaction product of a polyether polyol formed from a compound selected from the group consisting of ethylene oxide, propylene oxide, 1,2-butylene oxide, 1,4-butylene oxide and mixtures thereof; a low molecular weight polyalkylene glycol having from 3 to 7 carbon atoms; a crystalline polyester polyol having a melting point from about 40° C. to about 120° C.; and at least one polyfinctional isocyanate component wherein said composition has a moisture vapor transmission rate of greater than about 100 $g/m^2$/day film thickness of from about 450 to about 500 $g/m^2$, and hydrolysis resistance.

23 Claims, No Drawings

HIGH MOISTURE VAPOR TRANSMISSION HOT MELT MOISTURE CURE POLYURETHANE ADHESIVE WITH EXCELLENT HYDROLYSIS RESISTANCE

REFERENCES TO RELATED APPLICATIONS

FIELD OF THE INVENTION

This invention relates to hot melt moisture cure polyurethane compositions comprising the reaction product of a polyether glycol, a low molecular weight polyalkylene glycol, a crystalline polyester diol and at least one polyfunctional isocyanate component having two or more —NCO groups. The compositions can further optionally comprise a thermoplastic component. The compositions are useful as adhesives and coatings, and are particularly useful where high moisture vapor transmission rates and excellent hydrolysis resistance are desired.

BACKGROUND OF THE INVENTION

Materials that are permeable to water only in vapor form have been commercially available for a considerable period of time. These materials do not allow the passage of water in liquid form and therefore are extremely useful where it is desired to keep underlying articles or skin dry while allowing air and water vapor to travel through the material. These water vapor permeable materials are useful for athletic clothing, medical garments, rain gear, tarpaulins, tents and other waterproof garments.

It is often desirable to fasten such materials to other substrates. Polyurethanes are commonly used as adhesives or coatings for these materials and it is therefore necessary that the polyurethane compositions also have a high moisture vapor transmission rate.

U.S. Pat. No. 4,194,041 to Gore et al. issued Mar. 18, 1980 teaches a layered article that prevents liquid water from penetrating through while at the same time permitting moisture vapor to pass out through the article. Gore teaches a hydrophilic layer which is a liquid polyether-polyurethane. The liquid polyurethane involves the mixing of two or more liquids, which are generally of low molecular weight. The initial physical properties of the system are poor until the curing proceeds to some degree. Such characteristics include green strength and low flow characteristics. Green strength refers to the strength of the bond after the composition sets, but before the composition is cured. Generally, these polyurethane adhesives have value where the initial strength of the bond is unimportant. Substantial bonding often forms over a period of time between hours and days and the resultant bond has high tensile strength and is strong and resilient to external forces.

U.S. Pat. No. 4,925,732 to Driskill et al. teaches a laminate which comprises a solvent based moisture permeable adhesive. This adhesive is the reaction product of a polyol of primarily oxyethylene units, a chain extender having a molecular weight in a range lower than about 500 and a polyisocyanate. These adhesives are undesirable because of the problems typically associated with the use of a solvent.

U.S. Pat. No. 4,532,316 to Henn issued Jul. 30, 1985 teaches how to make and use a hot melt moisture cure polyurethane prepolymer with high moisture vapor transmission rates which in elastomeric film form may be used in combination with other materials useful in rain protective garments. Henn uses a polyol, a polyisocyanate and a chain extender having a molecular weight in a range lower than about 500 used to build molecular weight faster, and therefore increase the green strength. Henn exemplifies the use of a poly(oxyethylene) glycol. There are disadvantages to the use of chain extenders including lower melt rates caused by the use of the chain extender, poor green strength and longer open times which consequently results in a surface which remains tacky longer. For coating applications, production will be slowed down, or it may be necessary to transfer coat which involves more steps. The transfer coating process also prevents the polyurethane composition from having an exposed surface during manufacturing which could result in the polyurethane undesirably adhering to equipment, or to other surfaces. Another problem associated with the use of chain extenders is stability during storage and during use at typical application temperatures from about 90° C. to about 110° C. Gelling is usually an indication of instability and can result when too much crosslinking takes place, ultimately destroying the processability and applicability of the prepolymer. In Example 1 at column 21 lines 29–32, Henn refers to a storage stability of 4 months, and in Example 3 at column 25 lines 29–31, Henn refers to the packaged prepolymer as remaining workable for at least several days. While this hot melt moisture cure is an improvement over the use of liquid moisture cure polyurethanes, the rate of set and green strength are still undesirably slow.

U.S. Pat. No. 5,508,371 to Werenicz et al. issued Apr. 16, 1996 teaches a polyurethane composition with superior moisture vapor transmission. Werenicz et al. teaches the use of a polyester polyol segmented with a polyether. Specifically, polyester polyols built up from aliphatic and aromatic dicarboxylic acids and diols having a chain length of between $C_2$ to $C_{20}$. The OH number of the polyester group lies between 10 and 50, and preferably between 10 and 40.

U.S. Pat. No. 5,166,302 to Werner et al. teaches a moisture curing polyurethane hot melt adhesive which utilizes crystalline polyester polyols which have short setting times. However, Werner et al. does not teach nor suggest how to combine specific crystalline polyester polyols with specific polyether polyols to obtain rapid setting hot melt moisture cure compositions which have high moisture vapor transmission rates. In fact, Werner et al. teaches moisture-crosslinking hot melt adhesives which are highly resistant to the creepage of moisture as found at column 1 lines 64 to 68 and column 2 lines 1 to 2.

In addition to the requirement of high moisture vapor transmission, many applications also require that the hot melt moisture cure composition have good hydrolysis resistance also referred to as washability. This is especially important for garments such as athletic apparel which will go through many wash cycles.

OBJECTS OF THE INVENTION

It is accordingly an object of the present invention to teach a unique combination of polyols and isocyanates which will ultimately result in polyurethane prepolymer compositions which have high moisture vapor transmission rates and excellent washability.

These prepolymers have low viscosity, excellent thermal stability and green strength. Green strength refers to the strength of a bond after the composition sets, but before the composition is cured.

The compositions may be designed to have a fast rate of set for coating applications or they may be designed to have a slower rate of set for adhesive applications where a long open time gives excellent bondability by allowing for more time for penetration into the substrates. They may be applied at low application temperatures from about 80° C. to about 120° C. which is beneficial for heat sensitive substrates such as very low gauge films.

Once cured, these one-part hot melt moisture cure polyurethane compositions have surprisingly high bond strength, very good flexibility, excellent mechanical strength, excellent moisture vapor transmission rates and superior hydrolysis resistance.

SUMMARY OF THE INVENTION

This invention relates to a reactive hot melt moisture cure polyurethane composition which has a set time of from about 10 seconds to about 5 minutes, a moisture vapor transmission rate of greater than about 100 grams per meter squared per day at a film thickness from about 450 to about 500 g/m$^2$ and excellent hydrolysis resistance.

This invention further relates to a hot melt moisture cure polyurethane which is the reaction product of a) at least one polyether polyol formed from one or more ingredients selected from the group including ethylene oxide, propylene oxide, 1,2-butylene oxide, 1,4-butylene oxide and mixtures thereof; b) at least one low molecular weight polyalkylene glycol said alkylene group having at least about 3 carbon atoms; c) at least one crystalline polyester polyol having a melting point from about 40° C. to about 120° C.; and d) at least one polyfunctional isocyanate component. The polyfinctional isocyanate preferably has about two or more NCO groups. The crystalline polyester polyol is preferably free of ether linkages.

The hot melt moisture cure polyurethane composition may further comprise a thermoplastic component to impart improved film forming characteristics. It is not necessary to the compositions of the present invention that a thermoplastic component be added to form a film. However, the present inventors have found that by adding the thermoplastic component, better films are formed.

The compositions may be applied at low application temperatures ranging from about 80° C. to about 120° C.

The resultant compositions have a set time from about 10 seconds to about 5 minutes. They can therefore be utilized for such coating applications where a fast rate of set is needed to adhesive applications where a slow set time is needed for better penetration and excellent bondability.

Prior to cure, the resultant compositions have superior green strength, low viscosities and excellent viscosity stability in the molten state, and once cured also have good flexibility, excellent mechanical strength, excellent moisture vapor transmission rates and excellent hydrolysis resistance.

The excellent moisture vapor transmission rates and excellent hydrolysis resistance makes them especially useful for adhering to, and for coating woven and nonwoven material for use in medical garments, athletic gear, rain protective garments and tarpaulins to mention only a few waterproof garments where breathability is desired. The hydrolysis resistance gives the hot melt moisture cure washability so that garments may withstand many wash cycles.

This invention further relates to a flexible laminate which comprises a) at least one flexible layer; and b) at least one hydrophilic hot melt moisture cure polyurethane layer wherein the hot melt moisture cure polyurethane composition is the reaction product of i) at least one polyether polyol formed from a compound selected from the group consisting of ethylene oxide, propylene oxide, 1,2-butylene oxide, 1,4-butylene oxide and mixtures thereof; ii) at least one low molecular weight alkylene glycol having at least about 3 carbon atoms; iii) at least one crystalline polyester polyol having a melt point from about 40° C. to about 120° C.; and iv) at least one polyfunctional isocyanate component.

Once cured, these one-part hot melt moisture cure polyurethane compositions have surprisingly high bond strength, very good flexibility, excellent mechanical strength, excellent moisture vapor transmission rates and surprisingly excellent hydrolysis resistance.

DETAILED DESCRIPTION OF THE PREFERRED EMBODIMENTS

The polyether polyols useful herein include those compounds which are homopolymers or copolymers which are formed from one or more ingredients including ethylene oxide, propylene oxide, 1,2-butylene oxide, 1,4-butylene oxide and mixtures thereof. These polyols may have a random or a block configuration. Some useful polyether glycols include those which are the reaction product of propylene oxide or butylene oxide capped or copolymerized with ethylene oxide. More preferably, the polyether glycol may be the reaction product of propylene oxide copolymerized with ethylene oxide and the mole % of ethylene oxide is less than 45 mole-%, preferably from about 5 mole-% to about 40 mole-% and even more preferably from about 20 mole-% to about 30 mole-% and the propylene oxide is preferably greater than 55 mole-%, more preferably from about 60 mole-% to about 95 mole-% and even more preferably from about 70 mole-% to about 80 mole-%. The number average molecular weight of the polyol is preferably from about 4000 to about 8000 grams/mole and more preferably from about 4000 to about 6000 g/mole.

The higher the ethylene oxide content of the polyether polyol and/or the polyurethane composition, the more hydrophilic the composition and the higher the moisture vapor transmission rate. However, polyols having 45 mole-% of ethylene oxide or higher have exhibited poor hydrolysis resistance and poor washability as tested according to Test Method No. 5 in the Test Methods section. A polyol which has a higher ethylene oxide content and having a high molecular weight may result in more crystalline, rigid composition which does not have good flexibility. Increasing the propylene oxide content, or butylene oxide content will accordingly increase the flexibility. Comonomers are preferable in the present invention.

Polyols having higher molecular weights have been found to have higher vapor transmission rates and more flexibility. Furthermore, higher molecular weight polyols also lower the amount of isocyanate required thus lowering the amount of urethane linkages, which may also increase moisture vapor transmission rates. Additionally, polyols having high amounts of ethylene oxide and molecular weights of about 2,000 or less have been found to have poor hydrolysis resistance.

The molecular weights of these polyether polyols are preferably greater than about 4,000 g/mole, more preferably from about 4000 g/mole to about 8000 g/mole and even more preferably from about 4,000 g/mole to about 6,000 g/mole.

These polyols are useful from about 20 wt-% to about 60 wt-% of the polyurethane prepolymer composition and preferably from about 30 wt-% to about 50 wt-% of the prepolymer composition.

These polyols are supplied by such manufacturers as Arco Chemical Co. (now Lyondell Petrochemical Co., Inc.) in Newtown Square, Pa., Huntsman Corp. in Houston, Tex., Texaco Chemical Co. in Bellaire, Tex., ICI Polyurethanes Group in West Deptford, N.J., BASF Corp. in Charlotte, N.C., Olin Corp. in Stamford, Conn., Union Carbide in Danbury, Conn., Mazer Chemicals in Gurnee, Ill., Ashland Chemical Co., Drew Division in Boonton, N.J., Dow Chemical Co. in Midland, Mich., Witco Corp. in Houston, Tex, and Bayer Corp. in Akron, Ohio.

The low molecular weight polyalkylene glycols useful herein preferably have a molecular weight of less than about 1,000 g/mole, more preferably from about 400 g/mole to about 1,000 g/mole and most preferably from about 400 g/mole to about 600 g/mole. The polyalkylene glycols are preferably those wherein the alkylene group has 3 or more carbon atoms such as polypropylene glycol or butylene glycol but polypropylene glycol is preferable. This low molecular weight component provides the hard segment of the prepolymer, increases the glass transition temperature, increases the strength and contributes to the hydrolysis resistance or washability. Typically, polyols having number average molecular weights of less than about 1,000 g/mole have been found to be less stable in the molten state, the compositions are useful in smaller amounts from about 5 wt-% to about 20 wt-% and preferably from about 1 0 wt-% to about 15 wt-%.

Those crystalline polyester polyols useful herein are those polyols having a melt point from about 40° C. to about 120° C. and glass transition temperatures, $T_g$'s, of less than about 0° C. Preferably, the crystalline polyester polyols are those which are the reaction product of either hexane diol or butane diol, and an acid which may include adipic acid, dodecanedioic acid, sebacic acid, terephthalic acid and mixtures thereof. Preferably, the acid is sebacic acid or dodecanedioic acid. Examples of useful polyester polyols include Dynacoll® 7360, 7371, 7380 and 7381 which are all crystalline polyester polyols available from Hüls America, Inc. in Piscataway, N.J. While this list is intended to illustrate the useful crystalline polyols, it is in no way intended as an exclusive list.

Furthermore, these crystalline polyester polyols are preferably free of ether linkages which may decrease the crystallinity of the polyester polyols. Those polyols having melting points of less than about 40° C. are no longer very crystalline. Those polyols which have melting points of greater than about 120° C. require high temperatures of application, which may be detrimental to fabrics which are heat sensitive and which may melt or deform as a result of the high temperatures. The higher the percentage of crystalline polyester polyol, the faster the finished composition will set. However, this is balanced against the decrease in the moisture vapor transmission rate as the amount of the crystalline polyester polyol is increased. For coating applications, it may be desirable to have a faster rate of set which can either be achieved by using higher levels of the crystalline component or by using polyols at the higher end of the range of crystallinity (i.e., those having higher melting points or higher enthalpies). For example, a polyol having a melting point of 120° C. will be more crystalline than one having a melting point of 80° C. These crystalline polyols are useful from about 10 wt-% to about 40 wt-% and preferably from about 15 wt-% to about 25 wt-% of the polyurethane prepolymer composition.

The isocyanates useful herein include those described in U.S. Pat. Nos. 4,775,719 issued Oct. 4, 1988, U.S. Pat. No. 4,808,255 issued Feb. 28, 1989 and U.S. Pat. No. 4,820,368 issued April 11 to Markevka et al. incorporated herein by reference. An example of a useful isocyanate compound is Isonate® 2125M, pure diphenylmethane diisocyanate (MDI) manufactured by Dow Chemical Co. in Midland, Mich. These isocyanate compounds are polyfunctional, having two or more —NCO groups, and include those isocyanates that are aliphatic, aromatic and those having mixtures thereof. The isocyanate compounds can also contain other substituents which do not substantially adversely affect the properties of the isocyanate compounds such as viscosity of the isocyanate terminated prepolymers, the adhesive properties of the bond line or the reactivity of the —NCO groups during the formation of the prepolymer. Typical aromatic isocyanates include diphenylmethane diisocyanate compounds (MDI) including its isomers, carbodiimide modified MDI, diphenylmethane 4,4'-diisocyanate, diphenylmethane-2,2'-diisocyanate, diphenylmethane-2,4'-diisocyanate, and other oligomeric methylene isocyanates; toluene diisocyanate compounds (TDI) including isomers thereof; tetramethylxylene diisocyanate (TMXDI), isomers of naphthalene diisocyanate, isomers of triphenylmethane triisocyanate, and mixtures thereof. Aliphatic di-, tri- and polyisocyanates are also useful including, for example, isophorone diisocyanate, hydrogenated aromatic diisocyanates, aliphatic polyisocyanates and cycloaliphatic polyisocyanates to mention only a few.

A catalyst may optionally be utilized in the compositions of the present invention to improve curing speed without adversely affecting other physical properties such as green strength or thermal stability. Preferred catalysts comprise both ether and morpholine functional groups, with 2,2-dimorpholinoethyl ether and di(2,6-dimethyl morpholinoethyl)ether being the most preferred. An example of a useful catalyst is 4,4'-(oxydi-2,1-ethanediyl) bis-morpholine. This catalyst is otherwise known as DMDEE and is available under the tradename of Jeffcat DMDEE from Huntsman Corp. located in Houston, Tex. Other catalysts such as ethylene diamine and organo tin and bismuth catalysts such as dibutyl tin dilaurate and dibutyl tin diacetate are not as advantageous. In general, bismuth octoate, for instance, is a very good hot melt moisture cure catalyst, but is less stable during shipping and storage where the temperatures may reach about 65° C. Other catalysts include aliphatic titanates having from 1–12 carbon atoms such as lower alkyl titanates including tetrabutyl titanate and tetraethyl titanate, and amines. These catalysts are useful from about 0.01% to about 2% by weight in the one-part hot melt moisture cure polyurethane composition.

The hot melt moisture cure polyurethane compositions of the present invention may optionally comprise a thermoplastic component. Preferred thermoplastic components include Pearlstick® thermoplastic polyesterurethane polymers from Aries Technologies in Derry, N.H., a distributor of Merquinsa located in Barcelona, Spain; thermoplastic polyetherurethane polymers sold under the tradename of Estane® and available from B.F. Goodrich Specialty Chemicals in Cleveland, Ohio; Hytrel® 8171, a butylene/poly (alkylene ether) phthalate from DuPont de Nemours in Wilmington, Del.; ethylene vinyl acetate copolymers also available from Du Pont de Nemours under the tradename of Elvax® and from Quantum Chemical Co., USI Division in Cincinnati, Ohio under the tradename of Ultrathene®; ethylene n-butyl acrylate copolymers available from Quantum Chemical Co., USI Division in Cincinnati, Ohio under the tradename of Enathene®, from Exxon Chemical Co. in Houston, Tex. under the tradename of Escorene® and from Elf Atochem North America in Philadelphia, Pa. under the tradename of Lotryl®; ethylene methyl acrylate available from Exxon under the tradename of Optema®; ethylene acrylate copolymers from Du Pont under the tradename of Elvaloy®; ethylene n-butyl acrylate carbon monoxide terpolymers available from Du Pont also under the tradename of Elvaloy® and acrylic polymers such as those supplied by ICI Acrylics located in St. Louis, Mo. under the tradename of Elvacite®. The present inventors contemplate the use of any thermoplastic polymers which would be compatible in the one-part hot melt moisture cure polyurethane compositions of the present invention. The critical requirement is that the copolymer selected be compatible with the polyols selected. This aspect of the invention is fully discussed in the patents previously incorporated herein by reference which are U.S. Pat. Nos. 4,775,719, 4,808,255 and 4,820,368 to Markevka et al. and U.S. Pat. No. 5,411,808 to Anderson et al. issued Aug. 15, 1995. These thermoplastic polymers may be present from about 5% to about 50% by weight of the resultant hot melt moisture cure polyurethane composition, preferably from about 5% to about 40% by weight of the composition, more preferably from about 5% to about 30% by weight of the composition and most preferably from about 5% to about 20% by weight of the composition.

The compositions of the present invention may optionally contain other ingredients. To improve the tack and to impart pressure sensitive qualities a tackifying resin may be incorporated. Tackifying resins should be selected based on compatibility with the composition. Also, those tackifiers having residual acid numbers such as rosin based tackifying resins and those resins having phenolic functionality are selected with care as the residual acid may react in the hot melt moisture cure system. One of skill in the hot melt adhesive art would recognize that there are numerous tackifying resins that may be utilized and the list is not exclusive.

Plasticizers may also be incorporated into the system. The plasticizers are carefully selected so as not to interfere with the efficacy of the other components, but will facilitate processing and increase flexibility of the composition.

Representative plasticizers and tackifying resins may also be found in U.S. Pat. Nos. 4,775,719, 4,808,255 and 4,820,368 to Markevka et al. and U.S. Pat. No. 5,441,808 to Anderson et al. herein incorporated by reference.

The compositions of the present invention may optionally contain fillers. Such fillers may include talcs, clays, silicas and treated versions thereof, carbon blacks and micas. Examples of such fillers include Mistron Vapor® talc from Luzenac America, Inc. in Englewood, Colo.; Nytal® 200, 300 and 400, different particle size grades of talc from R.T. Vanderbilt Co. in Norwalk, Conn.; Snobrite® Clay, a Kaolin clay available from Evans Clay Co. in Mcintyre, Ga.; Cab-o-sil® TD-720, a fumed silica available from Cabot Corp. in Tuscol, Ill. and Mineralite® 3X and 4X micas available from Mineral Mining Corp. in Kershaw, S.C.

A stabilizer or antioxidant can also be added to protect the composition from degradation caused by reaction with oxygen induced by such things as heat, light or residual catalyst from the raw materials such as the tackifying resin. Such antioxidants are commercially available from Ciba-Geigy in Hawthorne, N.Y. and include Irganox® 565, 1010 and 1076, all hindered phenolic antioxidants, and Anox® 20, also a hindered phenolic antioxidant from Great Lakes Chemicals in West Lafayette, Ind. These are primary antioxidants which act as free radical scavengers and may be used alone or in combination with other antioxidants such as phosphite antioxidants like Irgafos® 168 available from Ciba-Geigy. Phosphite antioxidants are considered secondary antioxidants, are primarily used as peroxide decomposers and are generally not used alone, but are instead used in combination with other antioxidants. Other available antioxidants are Cyanox® LTDP, a thioether antioxidant available from Cytec Industries in Stamford, Conn., Ethanox® 330, a hindered phenolic antioxidant, available from Albemarle in Baton Rouge, La. Many other antioxidants are available for use by themselves, or in combination with other antioxidants. These compounds are added to the hot melt moisture cure polyurethane composition in small amounts of up to about 2% by weight in the composition, and have no effect on the physical properties of the composition.

There are various other ingredients that can be added to such compositions including ultraviolet (UV) scavengers or absorbers, pigments to add color, fluorescing agents, odor masks, adhesion promoters (i.e. silane), surfactants, defoamers and so forth. Typically, these ingredients are added in small amounts of typically less than about 5% by weight of the composition and more typically less than about 2% by weight.

While the choice of component, order of addition and addition rate can be left to one of skill in the art, generally the reactive hot melt polyurethane compositions of this invention can be made by reacting the isocyanate and the polyols and then blending with the thermoplastic component and any other optional ingredient that may be added. The amount of each ingredient is based on a percentage of the resultant total weight of the hot melt moisture cure composition regardless of what the ingredients are. Optionally, the thermoplastic component can be blended with the polyols before reacting with the isocyanate.

The compositions are typically prepared by reacting the polyols, in this case at least one polyether polyol, at least one low molecular weight polyalkylene glycol, at least one crystalline polyester polyol and at least one polyfunctional isocyanate compound at an elevated temperature of typically between about 40° C. and about 200° C. The polyols may first be introduced into a reaction vessel, heated to reaction temperatures and dried to remove ambient moisture absorbed by the polyols. The polyfunctional isocyanate compounds are then added to the reactor. The polyols are generally reacted with the isocyanate compounds at ratios that typically depend on the hydroxy and isocyanate functionality of the reactants. Typically the compounds are reacted at ratios which result in a reaction between isocyanate groups and hydroxy groups leaving essentially no residual hydroxy and minimal isocyanate functionality, typically less than 10% by weight of the prepolymer. Typically the reaction between the polyol compounds and the isocyanate compounds is conducted at an OH:NCO ratio of between about 0.75:1.0 and 0.15:1.0 in order to obtain an NCO concentration in the final adhesive of about 1% to about 5% by weight. Typically the prepolymer is titrated to measure residual concentration of isocyanate using ASTM D-2572-80 "Standard Method for Isocyanate Group and Urethane Materials or Prepolymers" to determine completion of the reaction. The resultant compositions can then be packaged in suitable moisture proof containers.

The reactive hot melt urethane compositions can be cured after application using a variety of mechanisms. The curing reaction occurs between a compound having an available active hydrogen atom and the NCO groups of the polyurethane prepolymer. A variety of reactive compounds having free active hydrogens are known in the art including water, hydrogen sulfide, polyols, ammonia and other active compounds. These curing reactions may be carried out by relying on ambient moisture, or the active compounds may be added to the composition at the bond line. When the compositions react with water, urea groups are formed to provide a polyurethane urea polymer.

The prepolymer compositions have low viscosities of less than about 10,000 cPs, preferably from about 1,000 to about 5,000 and most preferably from about 1,500 to about 3,000 cPs at about 110° C. The temperature of application may therefore be low from about 80° C. to about 120° C. (175° F. to about 250° F.), preferably from about 80° C. to about 110° C. (about 175° F. to about 225° F) and even more preferably from about 80° C. to about 95° C. (about 175° F. to about 200° F.).

The compositions have good heat stability in the molten state as measured by a 5% or less increase in viscosity per hour at the temperature of application.

The resultant compositions generally have superior green strength, referring to the bond strength prior to cure. The resultant compositions may have a rate of set ranging anywhere from about 10 seconds or less to about 5 minutes. This set time simply refers to the formation of a tack free film. It is important for non-transfer type, direct coating techniques to utilize compositions which set quickly in 10 seconds or less. This refers to the formation of a substantially tack-free film within 10 seconds of less. This makes these compositions amenable to high speed converting operations because the coated material may be rolled or wound upon itself immediately prior to cure. For web type coaters which utilize self-winding techniques, the composition must form a film which does not adhere to the back of the substrate to which it is coated and does not interfere with the unwinding process of the finished roll. The compositions of the present invention may be therefore composed so as to make them ideally suited for direct coating onto any materials without transfer coating due to a high green strength and rapid rate of set which means that surface tack is lost rapidly, although transfer coating is not precluded. The rapid loss of tack indicates that these compositions will also not undesirably adhere to production equipment or other materials. Directly coating substrates allows for higher production speeds and higher economic efficiency because the amount of material used is decreased. These faster setting compositions will comprise amounts of the crystalline component at the higher end of the specified range, or a very crystalline material with a melting point at the higher end of the specified range.

For adhesive applications on the other hand, where a lamination or bond is made at the time of application, the rates of set may be longer and may preferably be from about 1 minute to about 5 minutes.

Once cured these compositions remain very flexible and have good mechanical strength.

The resultant compositions have moisture vapor transmission rates (MVTR) of greater than about 100 g/m$^2$/day, preferably greater than about 150 g/m$^2$/day and most preferably greater than about 175 g/m$^2$/day at a film thickness from about 18 to about 20 mils (about 450 g/m$^2$ to about 500 g/m$^2$ as measured by ASTM F 1249-90).

It is also possible to measure the MVTR using ASTM E 96 B wherein the MVTR would be greater than about 500 g/m$^2$/day at a film thickness of about 0.5 mils or 12.5 g/m$^2$. It is further possible to measure this aspect of the invention using a permeability coefficient as measured by ASTM F 1249-90. It is obvious to one of skill in the art that if the film thickness is decreased, the moisture vapor transmission rates will increase, and if the film thickness is increased, the moisture vapor transmission rates will decrease.

These compositions are also hydrophilic. In this instance, hydrophilicity refers to the transfer of substantial amounts of water through a film by absorbing water on one side of the film where the water vapor concentration is high, and desorbing or evaporating it on the opposite side of the film where the water vapor concentration is low. These materials do not readily allow the passage of other materials such as surface active agents and contaminants found in perspiration and other organic materials generally and also water in liquid form. This characteristic makes them ideal for adhesives and coatings which are used on flexible materials including woven and non-woven materials which are used for protective rain gear, athletic gear, medical garments, tarpaulins and tents to mention only a few waterproof garments where breathability is desired. Breathability is a term which also may be used to describe the permeability to water in vapor form, and transport of water by diffusion.

These compositions further have excellent washability or hydrolysis resistance. In a laboratory setting, excellent washability is defined as being able to withstand two accelerated and intense wash cycles. See Test Method No. 5 of the present invention. In a consumer setting, the compositions are held to a standard from about 50 wash cycles to about 100 wash cycles. Obviously, such washability is important when the compositions are utilized on clothing such as outdoor apparel or athletic apparel.

The compositions of the present invention may be used as either coatings, or as adhesives where two substrates are sealed together by applying either a continuous or an interrupted pattern of the composition to a first substrate, contacting the composition with a second substrate and allowing the composition to cure.

The compositions of the present invention may therefore be utilized as adhesives to laminate flexible layers together. Materials used in these laminates may include waterproof materials such as microporous films of polytetrafluoroethylene, polyurethanes, polypropylene, polyester, woven and tightly spaced nonwoven polyethylene and polypropylene, and other types of materials which are treated with hydrophobic agents, and so forth. Hydrophobic means that water will not spread on the material and wick into its porous structure. Water vapor, on the other hand, which may evaporate or desorb from the hydrophilic layer, is free to flow or diffuse as a gas through the pores of the hydrophobic layer to the exterior environment. These flexible layers may then further be laminated to other flexible layers including knitted or random laid materials such as fleeces. These materials may be nylon, polyester and nylon tricot knit for instance. These types of laminations are used in sporting apparel, usable/reusable medical garments, raincoats, tents and so forth. This list of films and textiles is illustrative of the present invention only and is not intended as an exclusive list.

In summary, these laminates therefore generally have one or more layers including any of the materials mentioned above, and another layer which may be an adhesive used between two layers referred to as adherents, or may be a coating on one layer.

The present inventors also envision that these compositions may be applied to rigid substrates including those materials used in manufacturing shoes, as well as for applications in the building industry.

Application methods may include slot die coating, roll coating, gravure coating, transfer coating, pattern coating, screen printing, spray and filament applications, extrusion and so forth. The application temperature may be varied between about 75° C. and about 125° C., preferably from about 80° C. to about 120° C. The sensitivity of the substrate to high temperatures may determine which application temperature is applicable. Such physical characteristics as the viscosity and rate of set of the compositions may be varied to accommodate such application conditions. Specific applications that the present inventors contemplate that the compositions of the present invention may be used for include that found in U.S. Pat. No. 5,560,974 to Langley issued Oct. 1, 1996 in which a composition would be used as a spot or pattern adhesive on a breathable non-woven composite fabric bonded to a microporous film, a coating material as found in U.S. Pat. No. 5,508,371 issued Apr. 16, 1996 to Werenicz et al. and as a hydrophilic layer as found in U.S. Pat. No. 4,194,041 issued Mar. 18, 1980 to Gore et al. These are only a few specific examples and it should be recognized that these compositions are contemplated for use in any application where a high moisture vapor transmission and excellent washability may be needed.

The following non-limiting examples further illustrate the invention.

EXAMPLES
TEST METHODS

1. Melt Viscosities
   The melt viscosities of the hot melt adhesives were determined on a Brookfield Thermosel Viscometer Model DV-I using a number 27 spindle.
2. Moisture Vapor Transmission Rate (MVTR)/Method A
   The MVTR was determined using ASTM E 96 B. Film thicknesses were varied between 0.625 mils and 1.25 mils. A DuPont resin was used as the standard of measurement.
3. Moisture Vapor Transmission Rate/Method B
   ASTM F 1249-90. The film thickness was 450–500 g/m$^2$ and the conditions used were 100° F. (37.8° C.) and 90% relative humidity.
4. Permeability Coefficient
   The permeability coefficient was determined using ASTM F1249-90, "Standard Test Method for Water Vapor Transmission Rate Through Plastic Film and Sheeting Using a Modulated Infrared Sensor." The test was conducted at about 37° C. (100° F.) and 90% relative humidity. Film thicknesses were about 40 mils.
5. Accelerated Hydrolysis Resistance (Washability)
   A flexible laminate is prepared by drawing down a 10 mil film (250 g/m$^2$) which is heated to an application temperature of 80° C. using a drawdown bar which has also been heated to 80° C., onto a first polyester substrate, and then laminating a second polyester substrate to the first. The laminate is allowed to cure for 7 days and is then placed in a reactor in a solution which is 20% sodium hydroxide (potassium hydroxide may also be used) and 0.5% laundry detergent (any kind to emulsify the mixture) in water. The laminate is washed for 1 hour at 160° F. (about 70° C.) using a metal stirring rod for agitation. The laminate was then rinsed with water for approximately 3 minutes to remove the soap and then dried at about 275° F. (about 130° C.) for about 15 minutes. The washing cycle was repeated. Delamination will occur in 1 or 2 cycles if the adhesive fails. If the adhesive passes, then T-peel tests are run on the laminate.
6. T-Peels
   ASTM D-1876-83. T-peels were determined using an Thwing-Albert Instrument (Intelect 500) or an Instron (Series 4500).

EXAMPLES
Polyol 1
   Polyol 1 is a polyether polyol comprised of the reaction product of 80 mole % of polypropylene oxide capped with 20 mole % of polyethylene oxide. The resultant polyol has an OH number of about 28.
Polyol 2
   Polyol 2 is a polyether polyol which is the reaction product of 70 mole % of polypropylene oxide capped with 30 mole % of polyethylene oxide. The resultant polyol has an OH number of about 28.
Polyol 3
   Polyol 3 is a polyether polyol which is a copolymer having 45 mole-% ethylene oxide and 55 mole-% polypropylene oxide. The resultant polyol has an OH number of about 56 and a molecular weight of about 2,000 g/mole. This polyol has been found to comprise too much ethylene oxide and does not have good washability.
Polyol 4
   Polyol 4 is a polyether polyol which is a copolymer having 45 mole-% ethylene oxide and 55 mole-% polypropylene oxide. The resultant polyol has an OH number of about 173. This polyol has been found to comprise too much ethylene oxide and does not have good washability.

Examples 1–3 and Comparative Examples A–D
Example 1
   A reactor was charged with about 180 grams of Polyol 1 (45 wt-%), 64.0 g of Dynacoll® 7371, a crystalline polyester polyol available from Hüls America (16.0 wt-%), 60.0 g (15.0 wt-%) of polypropylene glycol with an OH number of 260, 1.80 g Irganox® 1010 hindered phenolic antioxidant (0.45 wt-%), 0.12 g of 85% phosphoric acid (0.03 wt-%) and 0.08 g of Modaflow® Resin Modifier/defoamer (0.02 wt-%). The solids were then melted and dried at about 215° F. (about 100° C.) for 1 hour under vacuum. The temperature was lowered to about 160° F. (about 70° C.), the vacuum broken and 94.0 g of Isonate® 2125 M isocyanate (23.5 wt-%) was added. The reaction was allowed to proceed for about 2 hours at 190° F. (about 88° C.) under vacuum. The resultant product was then poured from the reactor and purged with nitrogen. The resultant NCO:OH ratio was 1.87.

The resultant prepolymer had a viscosity of 3,055 cPs at about 175° F. (about 80° C.).

The washability of the composition was tested using Test Method No. 5. All of the laminates were still intact after two wash cycles.

T-peels were determined using Test Method No. 6 above. The T-peel values were about 2 kg/cm for the unwashed laminates and substrate failure (i.e., the polyester fabric failed at the bond line) occurred both after the first wash cycle and after the second wash cycle.

The sample exhibited an MVTR of about 198 g/m$^2$/day as measured by Test Method No. 3 found in the Test Methods section (MVTR Method B).

Example 2
   The same procedure was followed as for Example 1 using 180 g of Polyol 2 (45 wt-%), 64.0 g of Dynacoll® 7371 (16.0 wt-%), 60.0 g of polypropylene glycol with a molecular weight of 400 g/mole, 1.80 g of Irganox® 1010 (0.45 wt-%), 0.03 g of 85% phosphoric acid, 0.08 g (0.2 wt-%) of Modaflow® Resin Modifier defoamer and 94.0 g 3.5 wt-%) of Isonate® 2125 M isocyanate. The reaction yielded a prepolymer with an CO:OH ratio of 1.84.

The resultant prepolymer had a viscosity of 3,020 cPs at about 175° F. (about 80° C.).

The washability of the sample was determined and the laminate remained intact after two wash cycles.

T-peels of the unwashed laminate were about 2.7 kg/cm and substrate failure occurred both after the first wash cycle and after the second wash cycle. No adhesive failure or delamination of the laminate was observed.

The film sample exhibited an MVTR of about 195 g/m$^2$/day as measured by WVTR Method B.

Example 3

The sample was prepared according to the method used in Example 1. The reactants were 60.0 g of Polyol 2 (15 wt-%), 120 g of a polypropylene glycol (PPG) with a molecular weight of 4000 g/mole (30 wt-%), 64 g of Dynacoll® 7371 crystalline polyester polyol (16 wt-%), 60.0 g of PPG with a molecular weight of 400 g/mole, 1.8 g Irganox® 1010 antioxidant (0.45 wt-%), 0.12 g (0.03 wt-%) of phosphoric acid (85%), 0.08 Modaflow® Resin Modifier/defoamer (0.02 wt-%) and 94.0 g of Isonate® 2125 M isocyanate (23.5 wt-%). This sample yielded an NCO:OH ratio of 1.86.

The resultant prepolymer had a viscosity of 2,730 cPs at about 175° F. (about 80° C.).

A laminate was made according to Test Method No. 5 in the Test Methods section. The laminate remained intact through two washing cycles. The T-peels were tested and the substrate, rather than the adhesive, failed.

The MVTR was measured and found to be 115.6 g/m$^2$/day at a film thickness of about 475 g/m$^2$. The permeability coefficient was about 4. This MVTR was found to be lower than some of the other compositions of the present invention.

Comparative Example A

The sample was prepared according to Example 1 using 192.0 g of Dynacoll® X-7210 PO6 (64 wt-%), an amorphous fused polyether-polyester polyol, 75.0 g (25.0 wt-%) of CAPA® 240 polycaprolactone diol, 1.44 g (0.48 wt-%) Irganox® 1010 antioxidant, 0.06 g Modaflow® defoamer (0.02 wt-%) and 31.5 g (10.5 wt-%) Isonate® 2125 M isocyanate. The product yielded an NCO:OH ratio of about 2.75. The resultant product was brown in color but compatible.

The viscosity of the resultant product was 27,400 cPs at about 175° F. (about 80° C.), 14,200 cPs at about 200° F. (about 93° C.) and 8,200 cPs at about 225° F. (about 107° C.) and about 5,200 cPs at about 250° F. (about 120° C.).

A laminate was prepared and put through one washing cycle. Delamination occurred during the washing step. The film of adhesive was separated from the polyester fabric. The film integrity and strength remained, however.

Comparative Example B

The sample was prepared according to Example 1 using 180.0 g of Polyol 3 (45 wt-%), 60.0 g (15.0 wt-%) of CAPA® 535011 polycaprolactone diol with a molecular weight of 8,000 g/mole, 58.0 g of polyethylene glycol with a molecular weight of 400 g/mole(14.5 wt-%), 1.92 g (0.48 wt-%) Irganox® 1010 antioxidant, 0.08 g Modaflow® defoamer (0.02 wt-%) and 100.0 g (25.0 wt-%) Isonate® 2125 M isocyanate. The product yielded an NCO:OH ratio of about 1.74.

Laminates were prepared according to Test Method No. 5 using an adhesive application temperature of about 200° F. (93° C.) and applying a film at a thickness of about 250 g/m$^2$. Nine laminates were made and three were unsoaked, three were put through one wash cycle and three were put through two wash cycles. The laminates remained intact after one wash cycle but some fabric discoloration was observed. After the second wash cycle the adhesive failed. The laminates showed fabric deterioration and when peeled the laminate came easily apart and the adhesive peeled off.

The unsoaked T-peel values were about 2.2 kg/cm. Substrate failure occurred with the laminates that went through one wash cycle and adhesive failure as well as substrate failure were observed for those laminates going through the second wash cycle.

Comparative Example C

The sample was prepared according to Example 1 using 192.0 g of Polyol 2 (48.0 wt-%), 64.0 g (16.0 wt-%) of Dynacoll® 7371 crystalline polyester polyol, 60.0 g of Polyol 4 (15.0 wt-%), 1.80 g (0.45 wt-%) Irganox® 1010 antioxidant, 0.12 g (0.03 wt-%) of phosphoric acid (85% solution), 0.08 g Modaflow® defoamer (0.02 wt-%) and 82.0 g (20.5 wt-%) Isonate® 2125 M isocyanate. The product yielded an NCO:OH ratio of about 2.01.

The resultant prepolymer had a viscosity of about 2,095 cPs at about 175° F. (about 80° C.).

Laminates were prepared according to Test Method No. 5 using a 250 g/m$^2$ film thickness and an application temperature of 175° F. (about 80° C.). The laminates were tested in the same manner as Comparative Example B and the same observations were made as for B.

T-peel values for the unsoaked laminates were 4.2 kg/cm. Substrate failure was observed after one wash cycle and adhesive failure and substrate failure were observed after two wash cycles. The laminates were weak and the fabric had deteriorated after one wash cycle. After two, the laminates could be easily peeled apart indicating adhesive failure.

Comparative Example D

The sample was prepared according to Example 1 and utilizing 104.4 g polypropylene glycol (26.1 wt-%) with an OH # of 94 and MW about 1000 g/mole; 62.64 g (15.66 wt-%) of polypropylene glycol with an OH # of 260 and MW about 400 g/mole; 100.24 g (25.06 wt-%) Dynacoll® 7361 crystalline polyester polyol; 20.0 g (5.0 wt-%) Synthetic Resin AP, 8.0 g (2.0 wt-%) Mistron Vapor Talc; 1.84 g (0.46 wt-%) Anox® 20 antioxidant; 102.72 g (25.68 wt-%) Isonate® 2125 M isocyanate compound; 0.12 g (0.03 wt-%) phosphoric acid (85%); 0.04 g (0.01 wt-%) Modaflow® Resin Modifier/defoamer.

The resultant composition exhibited T-peels for the unsoaked laminate of 1.9 kg/cm (10.6 lbs/in) and 1.9 kg/cm (10.5 lbs/in) after one wash cycle. All the bonds remained intact after one wash cycle and the fabric ripped or substrate failure occurred at the bond line after two wash cycles.

The moisture vapor transmission rate was about 16 g/m$^2$/day as measured by MVTR Method B which is unacceptable to the present invention.

This composition illustrates the use of the low molecular weight component which achieves good washability. However, due to the absence of any ethylene oxide and no higher molecular weight component, poor MVTR is exhibited.

What is claimed is:

1. A hot melt moisture cure polyurethane composition comprising the reaction product of:

a) at least one polyether polyol formed from at least one compound selected from the group consisting of ethylene oxide, propylene oxide, 1,2-butylene oxide, 1,4-butylene oxide and mixtures thereof;

b) at least one low molecular weight polyalkylene glycol, the alkylene groups of which have 3 to 7 carbon atoms;

c) at least one crystalline polyester polyol having a melting point of from about 40° C. to about 120° C.; and d) at least one polyfunctional isocyanate;

wherein the resultant one-part hot melt moisture cure polyurethane has a moisture vapor transmission rate of greater than about 100 grams per meter squared per day at a film thickness of about 400 to about 500 g/m², and hydrolysis resistance.

2. The composition of claim 1 wherein said polyether polyol comprises from about 5 mole-% to less than 45 mole-% of ethylene oxide.

3. The composition of claim 1 wherein said polyether polyol is the reaction product of from about 5 mole-% to about 40 mole-% of ethylene oxide copolymerized with from about 60 mole-% to about 95 mole-% of propylene oxide.

4. The composition of claim 1 wherein said polyether polyol has a molecular weight from about 3,000 g/mole to about 8,000 g/mole.

5. The composition of claim 1 wherein said polyether polyol has a molecular weight from about 4,000 to about 6,000 g/mole.

6. The composition of claim 1 wherein said low molecular weight polyalkylene glycol has a molecular weight from about 400 to about 1,000 g/mole.

7. The composition of claim 1 wherein said low molecular weight polyalkylene glycol has a molecular weight from about 400 to about 600 g/mole.

8. The composition of claim 1 wherein said low molecular weight polyalkylene glycol is propylene glycol.

9. The composition of claim 1 wherein said crystalline polyester polyol is the reaction product of at least one diol selected from the group consisting of hexane diol, butane diol and mixtures thereof and at least one acid selected from the group consisting of adipic acid, dodecanedioic acid, sebacic acid, terephthalic acid and mixtures thereof.

10. The composition of claim 1 wherein said polyester polyol is free of ether linkages.

11. The composition of claim 1 wherein said polyfunctional isocyanate is diphenylmethane-4,4'-diisocyanate.

12. The composition of claim 1 wherein said composition has a set time of greater than about 1 minute.

13. The composition of claim 1 wherein said composition has a set time of less than about 10 seconds.

14. The composition of claim 1 wherein said composition has a moisture vapor transmission rate of greater than about 175 g/m²/day at a film thickness from about 450 to about 500 g/m².

15. Waterproof garments selected from the group consisting of protective rain gear, athletic apparel, useable/reusable medical garments, tarpaulins and tents comprising the composition of claim 1 wherein said composition is utilized as an adhesive or as a coating on said garments.

16. A flexible laminate, comprising:
I. at least one flexible layer; and
II. at least one hydrophilic layer comprising the hot melt moisture curing composition of claim 1.

17. The flexible laminate of claim 16 wherein there are at least two flexible layers which are adherents, and the hydrophilic hot melt moisture cure layer is an adhesive.

18. The flexible laminate of claim 17 wherein at least one flexible layer is a nonwoven or woven material.

19. Waterproof garments selected from the group consisting of protective rain gear, athletic apparel gear, useable/reusable medical garments, tarpaulins and tents comprising the flexible laminate of claim 16 wherein said hydrophilic hot melt moisture cure polyurethane layer utilized as an adhesive of said flexible laminate.

20. The flexible laminate of claim 16 wherein said laminate remains intact after two accelerated wash cycles.

21. A hot melt moisture cure polyurethane composition comprising the reaction product of:
a) about 20% by weight to about 60% by weight of the polyurethane prepolymer composition of at least one polyether polyol formed from at least one compound selected from the group consisting of ethylene oxide, propylene oxide, 1,2-butylene oxide, 1,4-butylene oxide and mixtures thereof;
b) about 5% by weight to about 20% by weight of the polyurethane prepolymer of at least one low molecular weight polyalkylene glycol, the alkylene groups of which have 3 to 7 carbon atoms;
c) about 10% by weight to about 40% by weight of the polyurethane prepolymer of at least one crystalline polyester polyol having a melting point of from about 40° C. to about 120° C.; and
d) at least one polyfunctional isocyanate;
wherein the resultant one-part hot melt moisture cure polyurethane has a moisture vapor transmission rate of greater than about 100 grams per meter squared per day at a film thickness of about 400 to about 500 g/m², and hydrolysis resistance.

22. The composition of claim 21 wherein said polyether polyol has a molecular weight of greater than about 3,000 g/mole.

23. The composition of claim 21 wherein said polyether polyol comprises from about 5 mole-% to less than 45 mole-% of ethylene oxide.

* * * * *